US007136893B2

(12) United States Patent
Carlough et al.

(10) Patent No.: US 7,136,893 B2
(45) Date of Patent: Nov. 14, 2006

(54) DECIMAL MULTIPLICATION USING DIGIT RECODING

(75) Inventors: Steven R. Carlough, Poughkeepsie, NY (US); Eric M. Schwarz, Ulster, NY (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/616,556

(22) Filed: Jul. 10, 2003

(65) Prior Publication Data

US 2005/0010631 A1    Jan. 13, 2005

(51) Int. Cl.
*G06F 7/52* (2006.01)
(52) U.S. Cl. ...................................... 708/623
(58) Field of Classification Search ............. 708/623
See application file for complete search history.

(56) References Cited

U.S. PATENT DOCUMENTS

| 3,300,627 | A | * | 1/1967 | Arden ................. | 708/625 |
| 3,366,780 | A | * | 1/1968 | Lee et al. ............. | 708/628 |
| 4,390,961 | A |   | 6/1983 | Negi et al. ........... | 364/756 |
| 4,484,300 | A |   | 11/1984 | Negi et al. .......... | 364/755 |
| 4,745,569 | A | * | 5/1988 | Yamaoka et al. ..... | 708/623 |
| 5,262,976 | A |   | 11/1993 | Young et al. ........ | 364/760 |
| 5,379,245 | A |   | 1/1995 | Ueda ................... | 364/755 |
| 5,684,731 | A |   | 11/1997 | Davis .................. | 364/754 |
| 6,035,318 | A |   | 3/2000 | Abdallah et al. ..... | 708/628 |

OTHER PUBLICATIONS

IBM Tech Dis. Bull., Jul. 1973, vol. No. 16, Issue No. 2, pp. 680-682, Pub. Date Jul. 1, 1973, "Decimal Multiplier for Small Systems".*

"Packed Decimal Multiply Algorithm": Inventor: Hoffman, RL Schardt, TL: Pubname: TDB 10-75 pp. 1562-1563; Disclosure No. RO8750134: Oct. 1975.

"High Performance Two Cycle Loop Decimal Multiply Algorithm"; Inventors: Angiulli, JM Chang, DC Hornick, JC Nohilly, WJ Zajac, MW: Pubname: TDB 09-81 pp. 1845-1849; Disclosure No. PO8800209: Sep. 1981.

IBM Info Gate; "Improved Table Assisted Addition and Multiplication Methods"; Inventor: Wingert, JA; Pubname: TDB 02-83 pp. 4742-4743; Disclosure No. CT8800050; Feb. 1983.

IBM Info Gate; "High Speed Binary and Decimal Multiply"; Inventor: Singh, S. Weinberger, A; Pubname: TDB 05-76 pp. 4105-4106; Disclosure No. PO8750129; May 1976.

"Decimal Adder with Signed Digit Arithmetic"; Antenin Svoboda; Ieee Transactions on Computers, vol. C-18, No. 3, pp. 212-215, Mar. 1969.

"A Signed Binary Multiplication Technique"; Inventor: Andrew D. Booth; Oxford University Press; Q.J. Mech. Appl. Math 4:236-240, pp. 100-104, 1951.

* cited by examiner

*Primary Examiner*—Tan V. Mai
(74) *Attorney, Agent, or Firm*—Cantor Colburn LLP (57) ABSTRACT

A system and methodology for decimal multiplication in a microprocessor comprising: a recoder configured to recode decimal digits of a first operand to a corresponding set of $\{-5$ to $+5\}$. The recoder also configured to recode decimal digits of a second operand to a corresponding set of $\{-5$ to $+5\}$. The system also includes a multiplier array of digit multipliers, each digit multiplier configured to generate a partial product of a selected digit of a recoded first operand and a recoded second operand; and an adder array of digit adders, each adder configured to generate a sum of the partial products, wherein a least significant digit of the sum is shifted to a results register, and each adder includes carry feedback.

29 Claims, 4 Drawing Sheets

DECIMAL MULTIPLICATION USING DIGIT RECODING

FIELD OF THE INVENTION

This invention relates to computer systems for processing decimal numbers. The invention particularly is directed to arithmetic circuits for processing decimal numbers.

TRADEMARKS

IBM® go is a registered trademark of International Business Machines Corporation, Armonk, N.Y., U.S.A. Other names may be registered trademarks or product names of International Business Machines Corporation or other companies.

BACKGROUND

Decimal multiplication is a complex operation to implement in computer hardware. Typical methods for implementing decimal multiplication involve the computation and accumulation of partial product terms. The two data inputs to the operation are called the multiplier and the multiplicand. Commonly, the multiplier is separated into individual digits, and these digits are used to select multiples of the multiplicand which form the partial products. The partial products are summed to form the final product.

An existing method for reducing the amount of computation or computation time required to generate the partial product term uses a read only memory (ROM) to store all the possible products of two digits which range from 0 to 9. Such a methodology therefore, requires a 100 entry memory array, an equivalent programmable logic array (PLA) or combinatorial logic. Another method reduces the number of stored products by performing special tests for digits equal to zero or one. Thus only the combinations of digits which range in value from 2 to 9 are required yielding 64 combinations. These methods employ a linear array of digit multipliers to form each partial product term.

While these methods of multiplication are very simple and relatively easy to implement for decimal multiplication in hardware with a shifter, an adder, a product accumulator, and the like, it will be appreciated that for binary multiplication it takes one cycle to process one multiplier bit to form a partial product, an operation with an n-bit multiplier will take in the order of n cycles to finish. Such a long cycle-per-instruction (CPI) time in the current world of high-speed computing is considered a prohibitive solution. Therefore to achieve shorter CPI for multiply instructions, as mentioned above, additional hardware is expended to calculate the partial products in groups at a time and build the necessary adders to process them simultaneously. This brute force approach does decrease CPI but it also increases the chip area dedicated to the multiplication functions. Adders in particular, are difficult to handle, especially with the area and timing constraints that usually accompany the functional specifications. Many methods have therefore been formulated to decrease adder size through decreasing of partial products by processing the multiplier multiple bits at a time. One of the more popular methods is the Booth recoding algorithm.

The Booth recoding algorithm is a method for reducing the number of partial products produced from a given n-bit multiplier through multiple-bit scanning. It is based on the concept that a string of binary ones, where the least significant bit of value '1' holds a significant value of 2n and the string of ones is z bits long, may alternatively be represented as $2^{n+z}-2^n$. For example, the string 0b0111 may be represented as $2^3-2^0=7$, and the string 0b1110 as $2^4-2^1=14$.

In the previous example, the weight of each bit is equal to $2^n$ where n is the positional value of the relevant bit. The detection of a string of ones is done by overlapping the scanned group of multiplier bits by one bit. Applying this counting method to multiplication, where the scanned number is the multiplier in a 1-bit scan with an overlapping bit, is as simple as giving a bit that is at the end of a string (the least significant bit in the string), detected by a '1' bit whose overlapping bit to the right is a '0', a value of $-(2^n)*$(multiplicand); a bit that is at the beginning of the string (the most significant bit of the z-bit string), detected by a '0' in the position with the overlap bit equal to '1', a value of $(2^n)*$(multiplicand); and a bit that is in the middle of a string of 0's or 1's a value of zero. This is summarized in the table below, where the leftmost bit is the bit in position n of the string and the rightmost bit is the overlap bit needed for string detection. The "Justified Multiplicand Value" column gives the multiplicand-multiple value, the significance of this value may be implied with the position of the relevant scanned bit.

TABLE 1

Truth-Table For Radix-2 Booth Recoding

| 2-BIT SCAN | MULTIPLICAND VALUE | JUSTIFIED MULTIPLICAND VALUE |
|---|---|---|
| 00 | 0x | 0x |
| 01 | $(+2^n)$x | +1x |
| 10 | $(-2^n)$x | −1x |
| 11 | 0x | 0x |

The key to advantageous implementation of the Booth recoding method is in increasing the number of bits that are scanned in a group, thereby decreasing the overall necessary scans of the multiplier as well as the number of partial products and the hardware necessary to combine the partial products. A popular scan-group size is 3 bits, composed of 2 scanned bits with an overlap bit in the least significant position. Its popularity is based on the fact that the necessary multiplicand-multiples needed to realize the recoding is simply 0x, ±1x, and ±2x, all relatively easy to formulate using shifters, inverters, and two's complementation methods to realize all possible multiples, whereas larger scan-group sizes necessitate adders to formulate higher multiples such as ±3x. It is evident that while Booth recoding simplifies the multiplication task, it too is complex and burdensome. Booth recoding, while well suited for its intended purposes, does not exhibit the same benefits for decimal multiplication. Therefore, it would be of benefit in the art to have a multiplication methodology that reduces CPI and complexity of hardware and algorithms to perform multiplication.

SUMMARY OF THE INVENTION

These and other improvements are set forth in the following detailed description. For a better understanding of the invention with advantages and features, refer to the description and to the drawings.

Disclosed herein in an exemplary embodiment is a system for decimal multiplication in a microprocessor comprising: a recoder configured to recode decimal digits of a first operand to a corresponding set of {−5 to +5}. The recoder also configured to recode decimal digits of a second operand to a corresponding set of {−5 to +5}. The system also includes a multiplier array of digit multipliers, each digit multiplier configured to generate a partial product of a selected digit of a recoded first operand and a recoded second operand; and an adder array of digit adders, each adder configured to generate a sum of the partial products, wherein a least significant digit of the sum is shifted to a results register, and each adder includes carry feedback.

Also disclosed herein in another exemplary embodiment is a method for decimal multiplication comprising: recoding decimal digits of a first operand to a corresponding set of $\{-5$ to $+5\}$; and recoding decimal digits of a second operand to a corresponding set of $\{-5$ to $+5\}$. The method also includes generating a partial product of a selected digit of a recoded first operand and a recoded second operand with a multiplier array of digit multipliers; and accumulating a sum of the partial products with an adder array of digit adders, wherein a least significant digit of the sum is shifted to a results register, and each adder includes carry feedback.

Disclosed herein in yet another exemplary embodiment is a system for decimal multiplication in a microprocessor comprising: a means for recoding decimal digits of a first operand to a corresponding set of $\{-5$ to $+5\}$; a means for recoding decimal digits of a second operand to a corresponding set of $\{-5$ to $+5\}$; a means for generating a partial product of a selected digit of a recoded first operand and a recoded second operand with a multiplier array of digit multipliers; and a means for accumulating a sum of the partial products with an adder array of digit adders, wherein a least significant digit of the sum is shifted to a results register, and each adder including carry feedback.

BRIEF DESCRIPTION OF THE DRAWINGS

The present invention will now be described, by way of an example, with references to the accompanying drawings, wherein like elements are numbered alike in the several figures in which.

Our detailed description explains the preferred embodiments of our invention, together with advantages and features, by way of example with reference to the drawings.

DETAILED DESCRIPTION OF THE INVENTION

Figure 1:
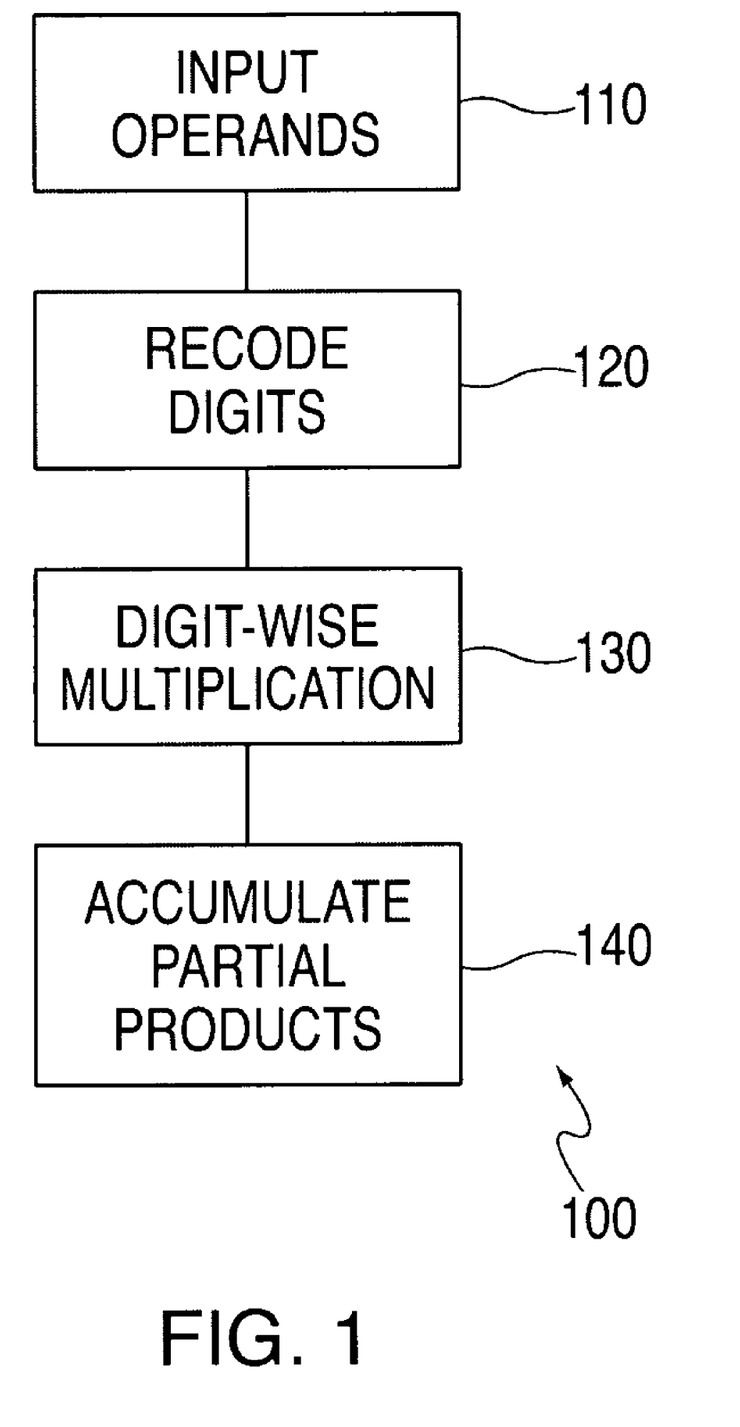
FIG. 1 depicts a simplified block diagram for multiplication methodology in accordance with an exemplary embodiment.
Figure 2:
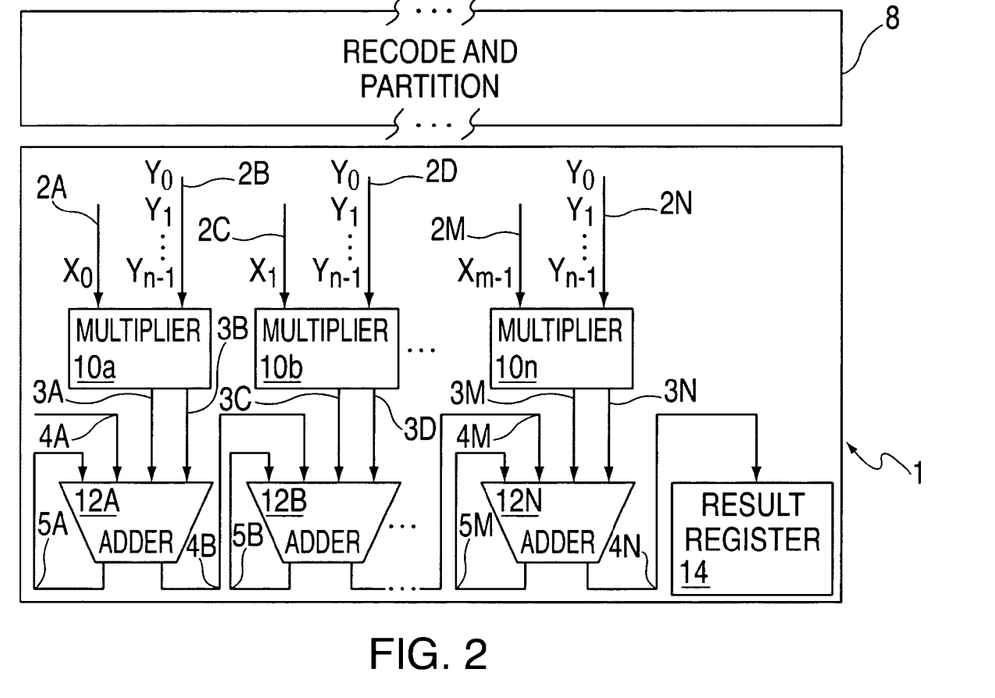
FIG. 2 illustrates a simplified block diagram for a linear array of digit multipliers for generating and accumulating a full partial product term.

Referring to FIGS. 1 and 2, disclosed herein in an exemplary embodiment, is a methodology 100 for decimal multiplication including a recoding of decimal digits to the set $\{-5$ to $+5\}$. By recoding the decimal digits, the complexity of a digit by digit multiplier is reduced from 64 combinations to only 16 combinations, if digits 0 and 1 are implemented as special cases. Furthermore, the number of combinations may be further reduced to only 9 combinations since the recoding facilitates the digit 2 also being handled as a special case with little additional hardware. This recoding significantly reduces the hardware complexity for a digit at a time multiplier thus simplifying resulting implementation no matter whether a PLA, memory device, or combinatorial logic is used. It will be appreciated that an embodiment of the invention described may be implemented with variations of the described multiplier that generates a signed BCD carry digit and a signed or unsigned BCD sum digit. It will also be, appreciated that the actual methodology employed is implementation specific and depends on the implementation of an adder that follows the multiplication step. In an exemplary embodiment, a multiplier apparatus 1 comprising a recoder 8 and an array of digit multipliers 10 denoted in FIG. 2 as 10a 10b . . . 10n are used to create an entire partial product for a multiplication step (e.g., for a digit of the multiplier Y) in a single cycle. This array of multipliers 10a, 10b . . . 10n provides the partial product data to a linear array of adder circuits 12a, 12b . . . 12n capable of accumulating a partial product per cycle. A carry feedback path in the array of adders 12a, 12b . . . 12n addresses the adder overflow to avoid losses. A results register 14 accumulates the final results of the summation of partial products. An advantage of the approach described in an exemplary embodiment, is the separation of the signed carry digit from an unsigned sum digit to simplify the resulting accumulator as will be described in more detail at a later point herein. In an exemplary embodiment, the multiplier array is at least as wide as the recoded multiplicand, that is, a multiplier 10 is provided for each digit of the recoded multiplicand. It will be appreciated that based on the recoding algorithm described herein this could result in the recoded multiplicand exhibiting one additional digit compared with the un-coded multiplicand.

Turning to FIG. 1 again, the multiplication methodology 100 of an exemplary embodiment using digit recoding includes three primary processes. First, the multiplicand and multiplier operands are obtained as depicted at process 110. Second, a digit recoding process 120 is employed, where the multiplier and multiplicand decimal digits are recoded from the set $\{0$ to $9\}$ to the set of numbers $\{-5$ to $+5\}$. Second, as depicted at process block 120 a digit multiplication is performed, where a partial product term is computed a digit at a time. Third, the partial product accumulation is performed as depicted at process block 140, where the current partial product is added to the sum of previously accumulated partial product terms to form the final product.

Operand Recoding

In an exemplary embodiment, a decimal recoding algorithm is used at process 120 and recoder block 8 to convert Binary Coded Decimal (BCD) digits of the operands into redundant recoded numbers. The multiplicand, also denoted as X in the figure, and multiplier, also denoted as Y in the figure, are recoded employing the digit set of $\{-5, -4, -3, -2, -1, 0, +1, +2, +3, +4, +5\}$. Each digit is recoded in parallel. In an exemplary embodiment, to recode a BCD digit, two digits are inspected, the digit to be recoded and the next lesser significant digit. The lesser significant digit is checked to determine if its value is equal to or greater than five (5). If it is five (5) or greater this will affect the current digit being recoded by an addition of one (1). Therefore if the current digit is greater than or equal to five (5) the digit for the ith digit of the multiplicand for example, is recoded to:

$$X_i - 10 + C$$

where $X_i$ is the current digit of the multiplicand; and C is a correction of one (1) if the lesser significant digit is five (5) or greater. If the current digit is less than 5 the digit is recoded to:

$$X_i + C.$$

For example, if the current digit is 6 and the lesser significant digit is 3, the current digit will be recoded to $6-10+0$ which is $-4$. Likewise, if the current digit is 5 and the lesser significant digit is 5, the current digit will be recoded to 5−10+1 which is −4. Table 2 shows the results of this recoding scheme for each digit and each condition for the lesser significant digit:

TABLE 2

Decimal Recoding.

| Current Decimal Digit | Lesser Significant Digit | Recode |
|---|---|---|
| 0 | <5 | 0 |
| 0 | >=5 | +1 |
| 1 | <5 | +1 |
| 1 | >=5 | +2 |
| 2 | <5 | +2 |
| 2 | >=5 | +3 |
| 3 | <5 | +3 |
| 3 | >=5 | +4 |
| 4 | <5 | +4 |
| 4 | >=5 | +5 |
| 5 | <5 | −5 |
| 5 | >=5 | −4 |
| 6 | <5 | −4 |
| 6 | >=5 | −3 |
| 7 | <5 | −3 |
| 7 | >=5 | −2 |
| 8 | <5 | −2 |
| 8 | >=5 | −1 |
| 9 | <5 | −1 |
| 9 | >=5 | 0 |

It may readily be appreciated that this recoding is similar to the Booth encoding of binary numbers, such as in radix-4 recoding where 2 bits are converted to the set {−2,−1,0,+1,+2}. There is no carry propagation necessary since two digits are scanned at a time with an overlap of groups. By eliminating the need for carry propagation, the recoding hardware is both small and fast.

Digit Multiplication

Continuing with the multiplication process 100 of FIG. 1, digit-wise multiplication is used to generate the partial products as depicted at 130. Continuing with FIG. 2, and now referring to FIG. 3, a block diagram of an exemplary multiplier 10 implementation optimized for recoded digits is depicted. Each multiplier 10 of the multiplier array 10a, 10b . . . 10n is supplied a digit of the recoded multiplicand $X_0-X_{M-1}$ and a selected digit of the recoded multiplier, $Y_i$ for instance. It will be appreciated that with successive cycles successive digits of the multiplier Y are supplied to the multiplier array 10a, 10b . . . 10n for generation of the respective partial products.

Figure 3:
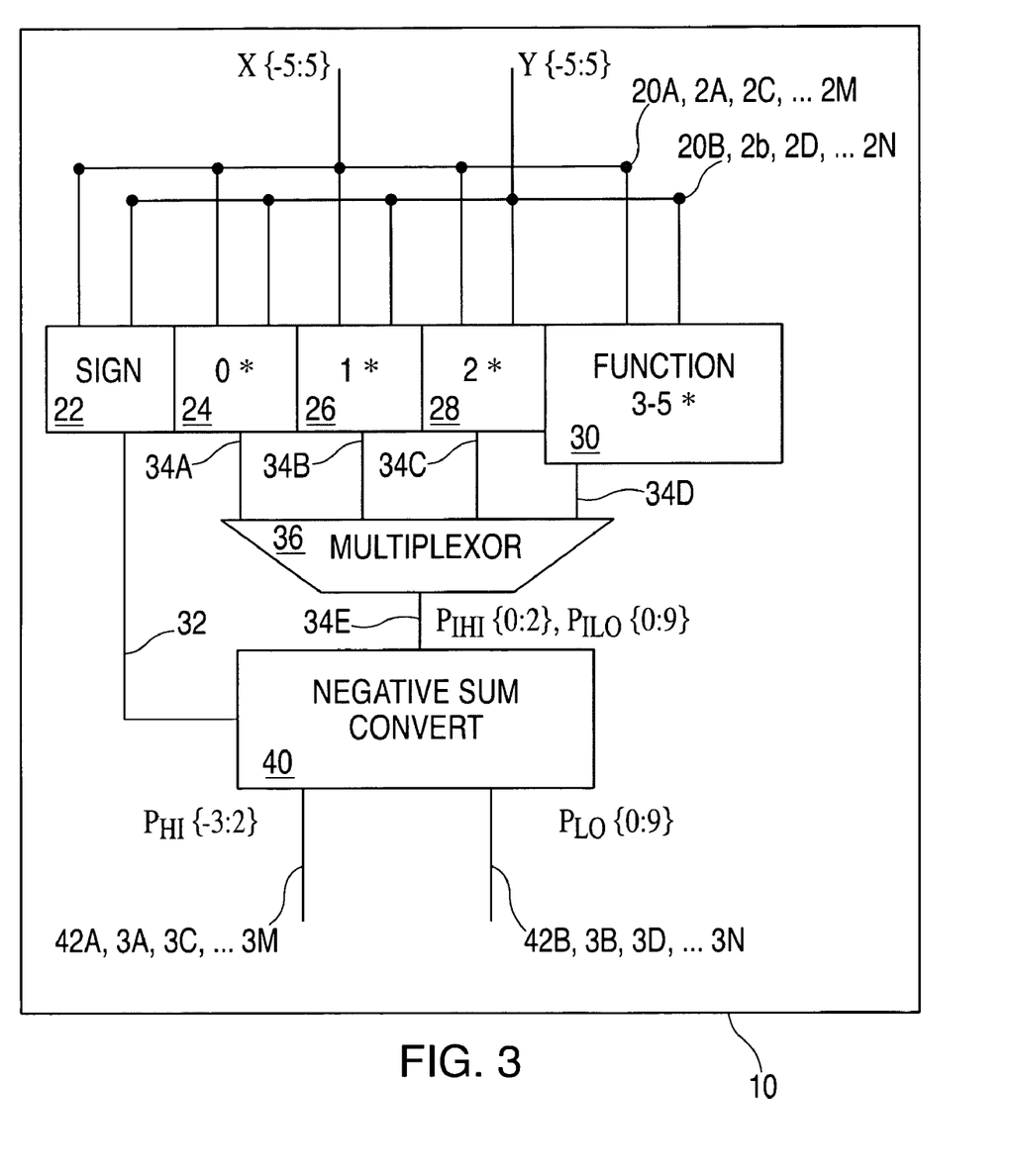
FIG. 3 illustrates a simplified block diagram for a recoded decimal digit multiplier.

A digit of the multiplicand, in this instance for illustration, $X_0$, includes a recoded digit in the range {−5 to +5} enters the first multiplier 10A hardware on the 4-bit input bus denoted as 20A. In an exemplary embodiment, this bus includes a 1-bit sign and a 3-bit magnitude ranging from {0 to 5}. Likewise, a selected digit of the multiplier $Y_i$ enters the multiplier 10 (10A in this example) on a 4-bit input bus 20B. This bus also includes a 1-bit sign and a 3-bit magnitude ranging from {0 to 5}. The resultant sign, computed in functional block 22, is independent of the other blocks and in one embodiment is simply an exclusive-OR of the input sign bits. This resultant sign is sent to a negative sum converter 40 via a 1-bit bus denoted as 32. The multiplier 10 also includes detection for inputs equal to 0, 1, or 2, as depicted in function blocks 24, 26 and 28, respectively. It will be appreciated that these multiples are readily identified and minimal hardware is required to detect these special cases to facilitate generating the appropriate product separately. Moreover, separating the special cases of 0, 1, or 2 significantly reduces the hardware necessary in the main product generator 30. Advantageously, it may now be appreciated that since the main product generator 30 is only required to handle inputs in the range {3 to 5}, there are only nine combinations of inputs for consideration, which may readily be implemented with a ROM, PLA, direct combinatorial logic, and the like as well as combinations including at least one of the foregoing. The results from blocks 24, 26, 28, and 30 are sent on 6-bit buses 34A, 34B, 34C and 34D to a multiplexor 36. The appropriate intermediate product digits denoted as $P_{IHI}$ ranging from {0 to 2} and $P_{ILO}$ ranging from {0 to 9} are selected and sent to the negative sum converter 40 on a 6-bit bus 34E. The negative sum converter 40 generates the following function: $P_{HI}=P_{IHI}$ and $P_{LO}=P_{ILO}$ if the sign from block 22 is positive; $P_{HI}=P_{IHI}-1$ and $P_{LO}=10-P_{LO}$ if the sign is negative. For example, if the result is (−2)(5) on $P_{IHI}$ and $P_{ILO}$ it is converted to (−3)(+5). The product digit $P_{HI}$, ranging from {−3 to +2} leaves the multiplier on the 3-bit output bus 42A, and product digit $P_{LO}$, ranging from {0 to 9}, leaves the multiplier on 4-bit output bus 42B.

An alternate embodiment may be employed that does not include the negative sum converter 40, and thereby would have the sign from block 22 applied to both digits of the product. It will be appreciated however, that only having a signed high term digit $P_{HI}$ exhibits an advantage because accumulating positive sums yields a simpler hardware implementation, but either implementation yields a feasible solution. Although shown here as separate blocks for clarity, it will be appreciated that one skilled in the in the art that the various functions depicted in this multiplier may readily be combined to reduce hardware configuration and propagation delay. It should also be appreciated that a two dimensional array of multipliers may be employed to compute all the partial product terms in parallel.

Partial Product Accumulation

Using an array of digit multipliers, partial products can be added together to generate long multiplication results. FIG. 2 shows how an array of digit multipliers and adders may be configured to generate a partial product accumulation every cycle. To illustrate how this array of digit multipliers works lets examine the following operation:

$$\begin{array}{cccc} X_0 & X_1 & \ldots & X_{n-1} \\ & Y_0 & Y_1 & \ldots & Y_{m-1} \\ \hline R_0 & R_1 & R_2 & R_3 & R_4 & \ldots & R_{n+m+1} \end{array}$$

$X_0, X_1, \ldots X_{n-1}$ are the digits of the recoded multiplicand, each digit having the range {−5:+5}, and enters the multiplier array on 5-bit input buses denoted as 2A, 2C through 2M. Likewise, $Y_0, Y_1 \ldots Y_{m-1}$ are the recoded digits of the multiplier. In each successive cycle, replicated copies of one of these digits enter the array on 5-bit input buses 2B, 2D and 2N. Resultants denoted as $R_0$ through $R_{n+m+1}$ (See also Table 2 below) represent the final product of the original multiplier and multiplicand. In an exemplary embodiment, the partial product terms are generated using the array of digit multipliers 10A, 10B, . . . 10N. For this operation, the results on output buses 3A, 3B, 3C, 3D, through 3M and 3N contain the partial product terms $X_0Y_{m-1}, X_1Y_{m-1} \ldots X_{n-1}Y_{m-1}$ respectively. It should be appreciate that for the configuration illustrated in FIG. 2, the buses 3A, 3C, through 3M contain the high order terms of the partial product digits, and buses 3B, 3D, through 3N contain the low order terms. At the output of the digit multipliers 10A, 10B, . . . 10N using the exemplary implementation depicted, there is a 3 bit signed magnitude carry (tens) digit and a least significant positive product digit. This new partial product is sent to the adders 12A, 12B, . . . 12N and to result register 14.

Continuing with FIG. 2, during the adder stage, the previously accumulated partial product terms are shifted one digit to the right on 4-bit buses 4A, 4B, through 4M, and 4N. These buses also serve as output buses for the most significant digits of the product generated during the accumulation of the last partial product. Each cycle, the least significant digit of the accumulated sum is shifted out of the adder array into a result register 14. The signed carry terms from the previous partial product accumulations are fed back into each adder on 3-bit buses 5A, 5B, through 5M.

FIG. 3 depicts an exemplary adder stage used to accumulate the partial product in FIG. 2. Although shown here as separate blocks for clarity, it is obvious to someone familiar in the art that these various functions could be combined or repartitioned to reduce hardware and propagation delay.

Figure 4:
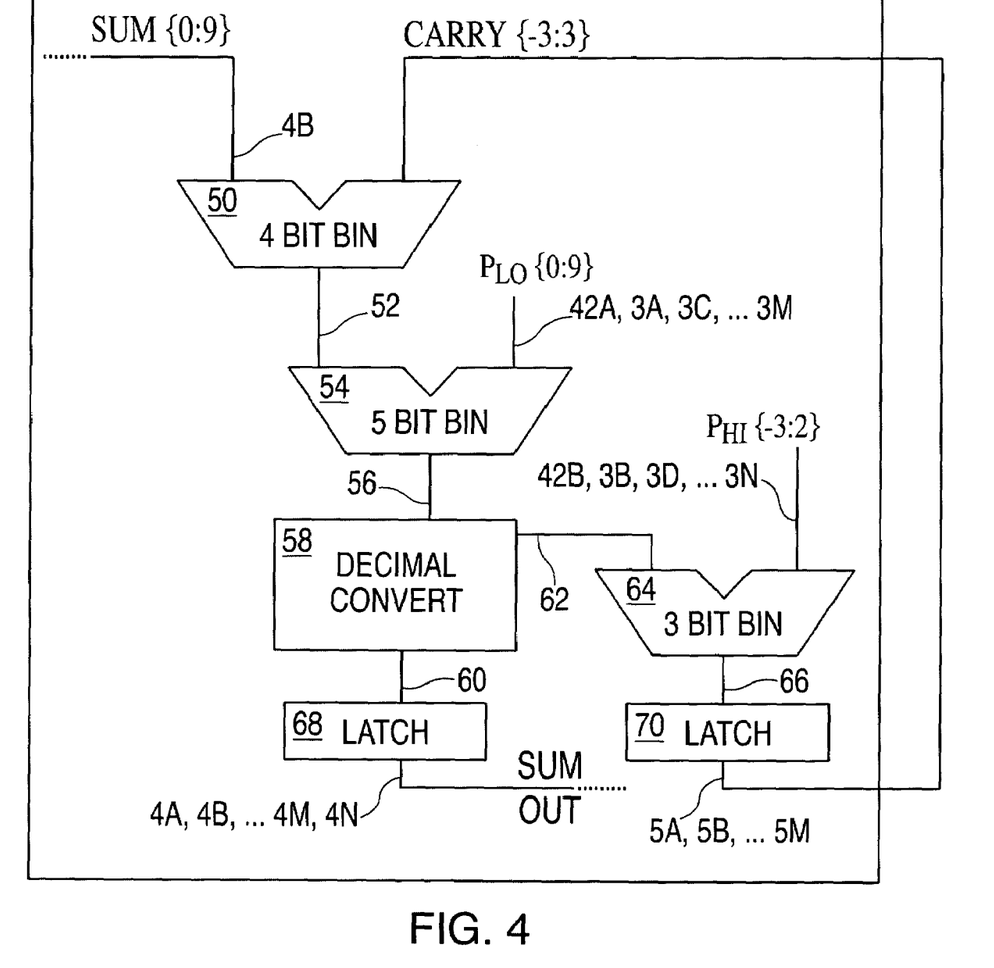
FIG. 4 illustrates a simplified block diagram of an adder structure as may be employed to accumulate recoded digit partial product terms.

The output from the multiplier previously discussed ($P_{LO}$ and $P_{HI}$) enter the adder unit on 4-bit input bus 3A (or 3C, . . . 3M) (42A in FIG. 3) and 3-bit input bus 3B (or 3D, . . . 3N) (42B in FIG. 3) respectively. A third input received by the adder 12A, 12B, through 12N on 4-bit bus 4A, 4B, through 4M and 4N is the SUM output from the next most significant adder stage. For example, adder 12B receives the sum output from adder 12A on bus 4B. The 3-bit carry feedback path shown in FIG. 3 as buses 5A, 5B, through 5M is also shown in FIG. 4, it's range {−3:+3}. It will be appreciated that while the carry feedback path bus is depicted as external to the adder 12 structure, the path could be implemented internal as well. The 4-bit output bus denoted as 4A, 4B, through 4M and 4N is sent to the next lesser significant adder (e.g., 12B, see also FIG. 2), or in the case of the least significant digit and bus 4N, is sent to the result register 14. A 4-bit binary adder 50 receives inputs from the carry feedback path via buses 5A, 5B, through 5M and the sum output via buses 4A, 4B, through 4M and 4N from the previous (next most significant adder 12). The output of the 4-bit adder denoted 52 is summed together with input 3A (or 3C, . . . 3M) (42A in FIG. 3) in a 5-bit binary adder 54. The resultant, a 6-bit output denoted as 56 is in the range {−3 to +18} and is sent to a decimal digit converter 58. The decimal digit converter 58 has two output buses, a 4-bit output denoted as 60 in the range {0 to +9} and 2-bit bus 62 in the range {−1 to +1}. If the value on bus 56 is denoted as R and the values on outputs on buses 60 and 62 are denoted as S and T respectively, then the function of the decimal digit converter 58 is as follows:

If R<0, then S=10−R and T=−1.

If R>−1 and R<10, then S=R and T=0.

If R>9 then S=R−10 and T=1.

Continuing with FIG. 4, bus 62 and input 3B, (or 3D, . . . 3N) is sent to a 3-bit binary adder 64. The output of this adder 64 is 3-bit bus denoted as 66 and is in the range {−3 to +3}. Note that when input bus 4B for example for adder 12B is −3, input bus 3A, 3C, through 3M (3C in the instance of adder 12B) is +5 so the value on bus 62 is 0. Therefore, it will be appreciated that bus 66 can never be less then −3. Bus 60 is transmitted out of the adder via a 4-bit output latch 68 and bus 66 is transmitted out of the adder (12B in this instance) via the 3-bit latch 70. It will be appreciated that these values are used as inputs during the next cycle. The sum transmitted out of the adder (12B in this instance) via bus 4C as an input to the next least significant adder (e.g., 12N in the figure). The carry out is transmitted out and fed back into the adder (12B in this instance) via bus 5B.

TABLE 2

Flowchart for the Multiplication of Several Digits

Table 2 shows an example of how this hardware may be used to multiply the two decimal numbers X and Y as described above. During the first cycle, the first partial product results from the multiplier array of FIG. 2 ($P_{00}$ through $P_{0m-1}$ where $P_{ij}$ denotes the digit multiplication of ith digit of X by the jth digit of Y) passes through the adder (e.g., 12a) since there are no previous partial product terms. On the next cycle, the sum terms of the accumulated partial product ($SUM_{0m-1}$ to $SUM_{n-1m-1}$) are passed to the adder stage to the right (Adders 12B, through 12N) and carry terms ($C_{0m-1}$ to $C_{n-1m-1}$) are looped into the Adder's Carry inputs to be used for the next operation (buses 5A, 5B, and 5M in FIGS. 2 and 4). The least significant digit $R_{n+m+1}$ is shifted out of the adders and saved, this is the least significant digit of the final product.

During the next cycle, the multipliers 10A, 10B, through 10N send the next set of partial products ($P_{0m-2}$ through $P_{n-1m-2}$) to the adders 12A, 12B, through 12N. The least significant terms out of the multipliers 10A, 10B, through 10N ($P_{0m-2LO}$ through $P_{n-1m-2LO}$) is added to the sum from the next most significant stage from the previous cycle ($SUM_{0m-1}$ through $SUM_{n-2m-1}$), and the carry term that was looped back from the previous cycle. A new partial product accumulation is generated and the carry term (the most significant digit from the multiplier) is updated by the decimal converter 68 (FIG. 3).

Once this operation has been carried out M times, the M-1 least significant digits of the product has been computed, where M is equal to the number of digits in the multiplier. During the last cycle there are no new partial products entering the adders from the multipliers 10A, 10B, through 10N, but the carry digits from the previous cycle must be accumulated into the product. During this final operation the Mth digit ($R_n$) is shifted into the result register 14 and the remaining N digits are computed when the carry digits are accumulated into the partial product result.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for decimal multiplication in a microprocessor comprising:
   a recoder configured to recode decimal digits of a first operand to a corresponding set of {-5 to +5} and configured to recode decimal digits of a second operand to a corresponding set of {-5 to +5};
   a multiplier array of digit multipliers, each digit multiplier configured to generate a partial product of a selected digit of a recoded first operand and a recoded second operand; and
   an adder array of digit adders, each adder configured to generate a sum of said partial products, wherein a least significant digit of said sum is shifted to a results register, and each adder includes carry feedback.

2. The system of claim 1 wherein said multiplier array includes a digit multiplier for each digit of at least one of said first operand and said second operand.

3. The system of claim 1 wherein said first operand is a multiplicand and said second operand is a multiplier.

4. The system of claim 1 wherein said wherein said recoded first operand and said recoded second operand are further partitioned in each digit multiplier to separate digits corresponding to at least one of sign, zero, one, and two to reduce the total number of combinations of digits for said recoded first operand and said recoded second operand.

5. The system of claim 1 wherein said partial product is generated and accumulated every cycle for said selected digit and a particular digit of said recoded second operand.

6. The system of claim 1 wherein said digit multiplier includes a negative sum converter configured to facilitate generating said sum by partitioning said partial product and ensuring a least significant digit thereof remains positive.

7. The system of claim 1 wherein said and said partial product terms are added to an accumulation of previous partial product terms shifted one digit right such that a least significant digit shifted off is preserved as a result digit in said results register.

8. The system of claim 1 wherein said partial product comprises a signed BCD carry digit and a signed BCD sum digit.

9. The system of claim 1 wherein said partial product comprises a signed BCD carry digit and a positive BCD sum digit.

10. The system of claim 1 wherein said multiplier array of digit multipliers generates an entire partial product for each digit of said recoded first operand in each multiplication cycle, said each multiplication cycle corresponding to a selected digit of said recoded second operand.

11. The system of claim 1 wherein said carry feedback includes a carry out of said adder is shifted into a most significant digit to be accumulated with said sum.

12. A method for decimal multiplication comprising:
   recoding decimal digits of a first operand to a corresponding set of {-5 to +5};
   recoding decimal digits of a second operand to a corresponding set of {-5 to +5};
   generating a partial product of a selected digit of a recoded first operand and a recoded second operand with a multiplier array of digit multipliers; and
   accumulating a sum of said partial products with an adder array of digit adders, wherein a least significant digit of said sum is shifted to a results register, and each adder including carry feedback.

13. The method of claim 12 wherein said multiplier array includes a digit multiplier for each digit of at least one of said first operand and said second operand.

14. The method of claim 12 wherein said first operand is a multiplicand and said second operand is a multiplier.

15. The method of claim 12 further including partitioning said recoded first operand and said recoded second operand to separate digits corresponding to at least one of sign, zero, one, and two to reduce the total number of combinations of digits for said recoded first operand and said recoded second operand.

16. The method of claim 12 wherein said generating said partial product and accumulating a sum is completed every cycle for said selected digit and a particular digit of said recoded second operand.

17. The method of claim 12 further including partitioning said partial product and ensuring a least significant digit thereof remains positive to facilitate said accumulating.

18. The method of claim 12 wherein said accumulating includes adding said partial product terms to an accumulation of previous partial product terms shifted one digit right such that a least significant digit shifted off is preserved as a result digit in said results register.

19. The method of claim 12 wherein said partial product comprises a signed BCD carry digit and a signed BCD sum digit.

20. The method of claim 12 wherein said partial product comprises a signed BCD carry digit and a positive BCD sum digit.

21. The method of claim 12 wherein said generating forms an entire partial product for each digit of said recoded first operand in each multiplication cycle, said each multiplication cycle corresponding to a selected digit of said recoded second operand.

22. The method of claim 12 wherein said carry feedback includes shifting a carry out into a most significant digit to be accumulated in said sum.

23. A system for decimal multiplication in a microprocessor comprising:
 a means for recoding decimal digits of a first operand to a corresponding set of {−5 to +5};
 a means for recoding decimal digits of a second operand to a corresponding set of {−5 to +5};
 a means for generating a partial product of a selected digit of a recoded first operand and a recoded second operand with a multiplier array of digit multipliers; and
 a means for accumulating a sum of said partial products with an adder array of digit adders, wherein a least significant digit of said sum is shifted to a results register, and each adder including carry feedback.

24. The system of claim 23 wherein said multiplier array includes a digit multiplier for each digit of at least one of said first operand and said second operand.

25. The system of claim 23 further including a means for partitioning said recoded first operand and said recoded second operand to separate digits corresponding to at least one of sign, zero, one, and two to reduce the total number of combinations of digits for said recoded first operand and said recoded second operand.

26. The system of claim 23 further including a means for partitioning said partial product and ensuring a least significant digit thereof remains positive to facilitate said accumulating.

27. The system of claim 23 wherein said means for accumulating includes a means for adding said partial product terms to an accumulation of previous partial product terms shifted one digit right such that a least significant digit shifted off is preserved as a result digit in said results register.

28. The system of claim 23 wherein said means for generating forms an entire partial product for each digit of said recoded first operand in each multiplication cycle, said each multiplication cycle corresponding to a selected digit of said recoded second operand.

29. The system of claim 23 wherein said carry feedback includes a means for shifting a carry out into a most significant digit to be accumulated in said sum.

* * * * *